(12) United States Patent
Zhang

(10) Patent No.: US 11,776,139 B2
(45) Date of Patent: Oct. 3, 2023

(54) TRACKING METHOD AND DEVICE

(71) Applicant: SZ DJI TECHNOLOGY CO., LTD., Shenzhen (CN)

(72) Inventor: Wei Zhang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/646,855

(22) Filed: Jan. 3, 2022

(65) Prior Publication Data
US 2022/0301194 A1    Sep. 22, 2022

Related U.S. Application Data

(63) Continuation of application No. 16/599,832, filed on Oct. 11, 2019, now Pat. No. 11,216,958, which is a
(Continued)

(51) Int. Cl.
*G06T 7/292* (2017.01)
*G06T 7/70* (2017.01)
(Continued)

(52) U.S. Cl.
CPC ............ *G06T 7/292* (2017.01); *B64C 39/024* (2013.01); *G06T 7/70* (2017.01); *H04N 23/695* (2023.01);
(Continued)

(58) Field of Classification Search
CPC . G06T 7/292; G06T 7/70; G06T 2207/10024; G06T 2207/10048;
(Continued)

(56) References Cited

U.S. PATENT DOCUMENTS 10,796,425 B1 * 10/2020 Patel .................... G06T 7/85
2003/0069591 A1 * 4/2003 Carson ............... A61B 17/154
606/130
(Continued)

FOREIGN PATENT DOCUMENTS

CN    102256109 A    11/2011
CN    104061910 A    9/2014
(Continued)

OTHER PUBLICATIONS

The World Intellectual Property Organization (WIPO) International Search Report for PCT/CN2017/085876 dated Feb. 26, 2018 6 Pages.

*Primary Examiner* — Jerome Grant, II
(74) *Attorney, Agent, or Firm* — ANOVA LAW GROUP, PLLC

(57) ABSTRACT

A tracking method includes obtaining first characteristic information of a target object through a first camera; obtaining second characteristic information of the target object through a second camera; tracking the target object based on the first characteristic information through the first camera; obtaining attitude information of a first gimbal to which the first camera is mounted; and adjusting an attitude of a second gimbal to which the second camera is mounted based on the attitude information of the first gimbal to maintain consistency between the attitude of the second camera and an attitude of the first camera.

18 Claims, 8 Drawing Sheets

Related U.S. Application Data continuation of application No. PCT/CN2017/085876, filed on May 25, 2017.

(51) Int. Cl.
  *B64C 39/02* (2023.01)
  *H04N 23/90* (2023.01)
  *H04N 23/695* (2023.01)
  *B64U 101/30* (2023.01)

(52) U.S. Cl.
  CPC ......... *H04N 23/90* (2023.01); *B64U 2101/30* (2023.01); *G06T 2207/10024* (2013.01); *G06T 2207/10048* (2013.01)

(58) Field of Classification Search
  CPC . G06T 2207/10032; G06T 2207/30232; G06T 7/80; G06T 7/90; B64C 39/024; H04N 23/695; H04N 23/90; H04N 23/60; B64U 2101/30; G05D 1/12; G05D 3/12
  USPC ......................................................... 382/103
  See application file for complete search history.

(56) References Cited

U.S. PATENT DOCUMENTS

| | | |
|---|---|---|
| 2013/0321197 A1 | 12/2013 | Klingler et al. |
| 2014/0253737 A1 | 9/2014 | Kempinski |
| 2015/0055886 A1 | 2/2015 | Oh et al. |
| 2016/0104285 A1 | 4/2016 | Pettegrew et al. |
| 2017/0195585 A1 | 7/2017 | Hsu et al. |
| 2018/0059665 A1* | 3/2018 | Shin ...................... B64C 39/024 |
| 2018/0114062 A1 | 4/2018 | Barrier et al. |
| 2018/0165833 A1* | 6/2018 | Inoue ...................... H04N 23/90 |
| 2018/0220081 A1 | 8/2018 | Lewis et al. |
| 2018/0343401 A1 | 11/2018 | Campbell et al. |
| 2020/0319537 A1 | 10/2020 | Hirobe |
| 2020/0319642 A1 | 10/2020 | Liu et al. |
| 2020/0333140 A1 | 10/2020 | Elson et al. |
| 2020/0389593 A1 | 12/2020 | Hu et al. |

FOREIGN PATENT DOCUMENTS

| | | | | |
|---|---|---|---|---|
| CN | 204688436 U | | 10/2015 | |
| CN | 105551280 A | | 5/2016 | |
| CN | 105554480 A | | 5/2016 | |
| CN | 105741477 A | | 7/2016 | |
| CN | 205486828 U | | 8/2016 | |
| CN | 106254836 A | | 12/2016 | |
| CN | 205847409 U | | 12/2016 | |
| CN | 106598075 A | | 4/2017 | |
| EP | 2669701 | * | 4/2013 | ............... G01S 7/40 |
| JP | 2006106910 | * | 4/2006 | ............... G05D 3/00 |
| JP | 2016219941 A | | 12/2016 | |
| KR | 101614654 B1 | | 4/2016 | |

\* cited by examiner

TRACKING METHOD AND DEVICE

CROSS-REFERENCE TO RELATED APPLICATIONS

This application is a continuation of U.S. application Ser. No. 16/599,832, filed on Oct. 11, 2019, which is a continuation of International Application No. PCT/CN2017/085876, filed on May 25, 2017, the entire contents of both of which are incorporated herein by reference.

TECHNICAL FIELD

The present disclosure relates to the technology field of unmanned aerial vehicles and, more particularly, to a tracking method and device.

BACKGROUND

As the advancement of the science and technology, unmanned aerial vehicle ("UAV") has increasingly rich functions. The application fields of the UAV are also continuingly expanding, including professional aerial photographing, power line inspection, etc. In a UAV application, target tracking is a very practical and important function, which may assist a user in setting a target object as a focus of the UAV. The user can track the target object or circling around the target object and observe the target object from different perspectives. As a result, the user is relieved from complicated operation processes.

When currently available technologies use the UAV to track a target object, it is difficult to track a target that has few characteristics or a small volume. When tracking the target, the gimbal may be automatically locked. Thus, it becomes difficult to adjust a tracking angle based on a user desired angle. It has become a research hotspot to find solutions to solve these issues.

SUMMARY

In accordance with an aspect of the present disclosure, there is provided a tracking method that includes obtaining first characteristic information of a target object through a first camera. The tracking method also includes obtaining second characteristic information of the target object through a second camera. The tracking method further includes tracking the target object based on at least one of the first characteristic information or the second characteristic information.

In accordance with another aspect of the present disclosure, there is provided a tracking device. The tracking device includes a first acquisition apparatus configured to obtain first characteristic information of a target object through a first camera. The tracking device also includes a second acquisition apparatus configured to obtain second characteristic information of the target object through a second camera. The tracking device further includes a tracking apparatus configured to track the target object based on at least one of the first characteristic information or the second characteristic information.

According to the technical solution of the present disclosure, a UAV may include a first gimbal, a second gimbal, a first camera, and a second camera. The first gimbal may be configured to control an attitude of the first camera, and the second gimbal may be configured to control an attitude of the second camera. The UAV may obtain first characteristic information of a target object through the first camera, and obtain second characteristic information of the target object through the second camera. The UAV may track the target object based on at least one of the first characteristic information or the second characteristic information. The method and device disclosed herein may significantly improve the tracking performance and expand the applicable scope of tracking.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
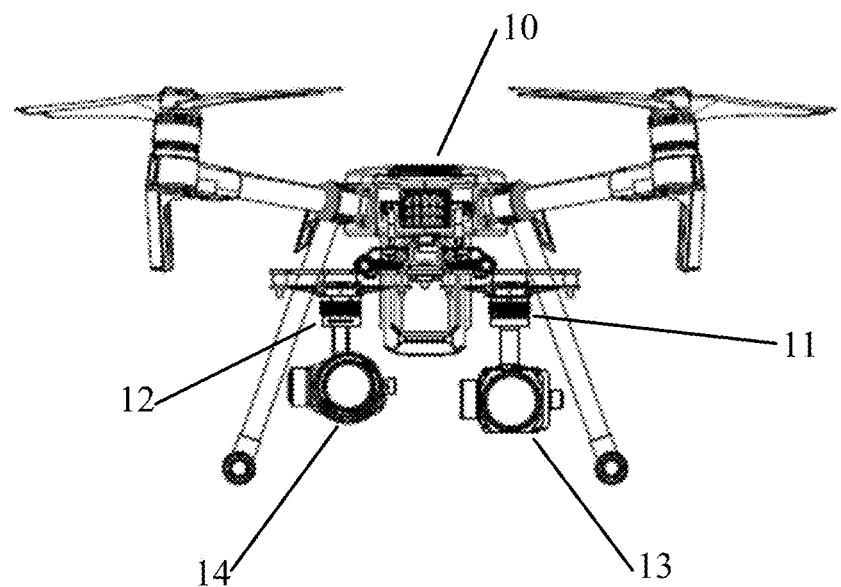
FIG. 1 is a perspective view of a UAV, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "module" as used herein includes hardware components or devices, such as circuit, housing, sensor, connector, etc. The term "communicatively couple(d)" or "communicatively connect(ed)" indicates that related items are coupled or connected through a communication channel, such as a wired or wireless communication channel. The term "unit" or "module" may encompass a hardware component, a software component, or a combination thereof. For example, a "unit" or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

FIG. 1 is a schematic diagram of a perspective view of a UAV. As shown in FIG. 1, the UAV of the present disclosure may include a body 10, a first gimbal 11, a second gimbal 12, a first camera 13, and a second camera 14. The first camera 13 may be mounted to the body 10 of the UAV through the first gimbal 11. The second camera 14 may be mounted to the body 10 of the UAV through the second gimbal 12. The first gimbal 11 may be configured to control an attitude of the first camera 13. The second gimbal 12 may be configured to control an attitude of the second camera 14.

The schematic diagram of the UAV shown in FIG. 1 includes two cameras and two gimbals corresponding to the two cameras as an example embodiment. It is understood that the number of cameras and number of gimbals included in the UAV are not limited by the present disclosure. For example, the UAV may include at least two imaging devices, and at least two gimbals corresponding to the at least two imaging devices. In some embodiments, the UAV may include two imaging devices and two gimbals corresponding to the two imaging devices. In some embodiments, the UAV may include more than two imaging devices and/or gimbals, such as four imaging devices and four gimbals corresponding to the two imaging devices. The imaging device may be a camera, a camcorder, or other types of imaging device, which is not limited by the present disclosure. For illustrative purposes, cameras are used as examples of the imaging devices.

In some embodiments, the tracking method and tracking device described below can be implemented in the UAV described herein. As an example, the UAV may be the UAV shown in FIG. 1. In other words, the tracking method and tracking device described below may be implemented in the UAV that includes the first gimbal 11, the second gimbal 12, the first camera 13, and the second camera 14. For tracking method and tracking device implemented in a UAV having more than two gimbals and cameras, the descriptions can refer to the descriptions of the embodiment in which the tracking method and tracking device are implemented in a UAV having two gimbals and two cameras.

Figure 2:
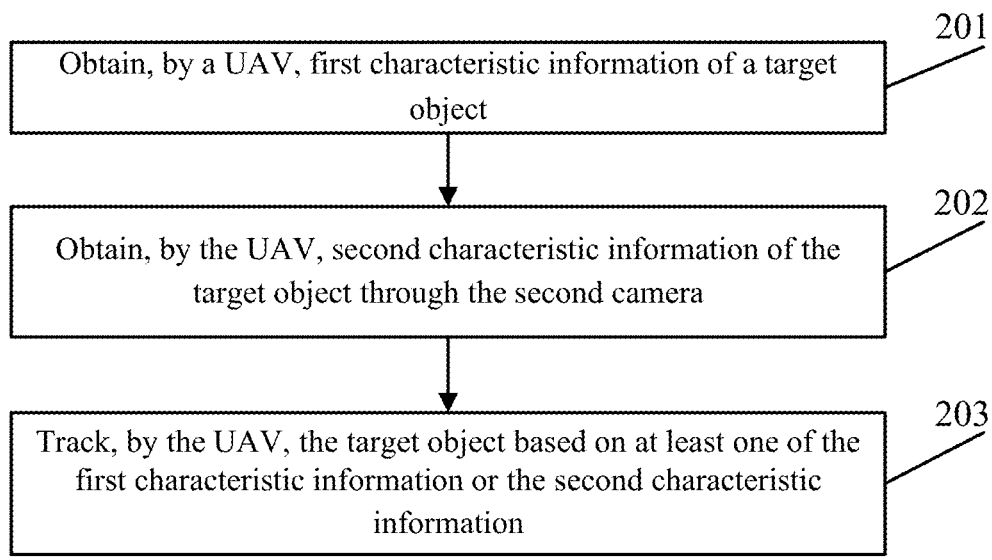
FIG. 2 is a flow chart illustrating a tracking method, according to an example embodiment.

FIG. 2 is a flow chart illustrating a tracking method. The tracking method may include:

Step S201: obtaining, by a UAV, first characteristic information of a target object.

In some embodiments, the UAV may obtain the first characteristic information of the target object through the first camera mounted to the first gimbal of the UAV. For example, when the UAV receives a control command (or in response to receiving a control command), the UAV may control the first camera based on an instruction included in the control command to acquire first image information that includes the target object, thereby further obtaining the first characteristic information of the target object based on the first image information that includes the target object. The first characteristic information may include color information, such as red (R), green (G), and blue (B), i.e., RGB color information. The first camera 13 may be an ordinary camera. The ordinary camera may obtain the RGB color information of the target object. In some embodiments, the first camera may be other type of cameras configured to obtain other type of characteristic information of the target object, which is not limited by the present disclosure.

Step S202: obtaining, by the UAV, second characteristic information of the target object through the second camera.

In some embodiments, the UAV may obtain the second characteristic information of the target object through the second camera mounted to the second gimbal of the UAV. For example, when the UAV receives a control command (or in response to receiving a control command), the UAV may control the second camera based on an instruction included in the control command to acquire second image information that includes the target object, and thereby further obtaining the second characteristic information of the target object based on the second image information that includes the target object. The second characteristic information may include heat distribution information. The second camera may be an infrared camera configured to obtain the heat distribution information of the target object. In some embodiments, the second camera may be other types of cameras configured to obtain other types of characteristic information of the target object, which is not limited by the present disclosure.

In some embodiments, the first characteristic information and the second characteristic information may include profile information of the target object. The first camera and the second camera may be different types of cameras. Thus, the type of the first characteristic information of the target object obtained by the first camera may be different from the type of the second characteristic information of the target object obtained by the second camera. When the type of the first characteristic information is different from the type of the second characteristic information, in some application scenes, the first characteristic information of the target object may compensate for deficiency of the second characteristic information, or the second characteristic information of the target object may compensate for the deficiency of the first characteristic information. Tracking the target object based on different characteristic information may effectively solve a problem of losing track of the target when tracking the target object based on one type of characteristic information. In some embodiments, the first camera and the second camera are the same type of cameras. Then the type of the first characteristic information of the target object obtained by the first camera may be the same as the type of the second characteristic information of the target object obtained by the second camera. When the types of the first characteristic information and the second characteristic information are the same, the first characteristic information and the second characteristic information of the target object may be fused together to obtain clearer and more accurate characteristic information of the target object.

Step S203: tracking, by the UAV, the target object based on at least one of the first characteristic information or the second characteristic information.

In some embodiments, the UAV may track the target object based on the first characteristic information of the target object and a preset tracking algorithm. In some embodiments, the UAV may track the target object based on the second characteristic information of the target object and the preset tracking algorithm. In some embodiments, the UAV may track the target object based on the first characteristic information and the second characteristic information of the target object and the preset tracking algorithm. The present disclosure does not limit how the UAV tracks the target object based on the first and/or second characteristic information.

In some embodiments, tracking, by the UAV, the target object based on at least one of the first characteristic information or the second characteristic information may include: simultaneously tracking, by the UAV through the first camera and the second camera, the target object based on the first characteristic information and the second characteristic information.

In some embodiments, the UAV may first obtain location information of the target object relative to the first camera based on the first image information that includes the target object that is acquired by the first camera and the obtained first characteristic information of the target object. The UAV may obtain location information of the target object relative to the second camera based on the second image information that includes the target object that is acquired by the second camera and the obtained second characteristic information of the target object. In some embodiments, the location information of the target object relative to the first camera or the second camera may include: an azimuth angle of the target object relative to the first camera or the second camera, location information of the target object in the first camera or the second camera. The UAV may fuse the location information of the target object relative to the first camera and the location information of the target object relative to the second camera to obtain fused location information of the target object relative to the first camera and the second camera. The fused location information of the target object relative to the first camera and the second camera indicates a best location of the target object relative to the first camera and the second camera. Then, based on the fused location information of the target object relative to the first camera and the second camera, the UAV may adjust the attitudes of the first gimbal and the second gimbal, thereby changing attitude information of the first camera and attitude information of the second camera, such that the location of the target object relative to the first camera and the second camera is the best. Finally, the UAV may simultaneously track the target object based on the first characteristic information and the second characteristic information through the first camera and the second camera, in both of which attitude information has been changed. Through the above method, the target object may be tracked based on different characteristic information of the target object, thereby improving the tracking performance of the UAV.

In some embodiments, tracking, by the UAV, the target object based on at least one of the first characteristic information or the second characteristic information may include: the UAV may first track the target object based on the first characteristic information through the first camera. Then, when the UAV receives a tracking switch command (or in response to receiving a tracking switch command), the UAV may obtain third characteristic information of the target object through the second camera and track the target object based on the third characteristic information through the second camera.

In some embodiments, the UAV may first track the target object based on the first characteristic information of the target object through the first camera. In the meantime, the second camera may track the target object in other regions of the environment in which the target object is located. If an image of the other regions captured by the second camera includes the target object, then when the UAV receives the tracking switch command (or then in response to receiving the tracking switch command), the UAV may obtain the third characteristic information of the target object through the second camera. The UAV may track the target object based on the third characteristic information through the second camera. If the image of the other regions captured by the second camera does not include the target object, then when the UAV receives the tracking switch command (or in response to receiving the tracking switch command), the UAV may first obtain location information of the target object relative to the first camera, and then obtain location information of the target object relative to the second camera based on the location information of the target object relative to the first camera and a characteristic parameter of the second camera. The UAV may perform a tracking initialization based on the location information of the target object relative to the second camera. The tracking initialization may include: adjusting attitude information of the second camera, tuning a parameter of the second camera, and controlling the second camera to observe or track the target object, such that the second camera can capture an image of the target object. In some embodiments, the image of the target object may appear at a best location in the field of view of the second camera. Finally, the UAV may obtain the third characteristic information of the target object through the second camera, and track the target object based on the third characteristic information through the second camera.

In some embodiments, obtaining, by the UAV, the location information of the target object relative to the first camera may include: if the target object does not have a communication function, the UAV may calculate the azimuth angle of the target object relative to the UAV based on the characteristic parameter of the first camera and related information included in the image information obtained by the first camera that includes the target object. If the target object has a communication function, the UAV may receive location information of the target object transmitted by the target object. The location information of the target object may include any one of: the location information of the target object itself, or the location information of the target object relative to the UAV. The UAV may also obtain the location information of the target object through a positioning device preset on the UAV and the target object. The positioning device may include a global positioning system ("GPS"). In some embodiments, the characteristic parameter of the first camera or the characteristic parameter of the second camera may include at least one of a camera parameter or attitude information.

In some embodiments, after the UAV receives the tracking switch command (or in response to receiving the tracking switch command), during the process of the UAV tracking the target object based on the third characteristic information of the target object obtained through the second camera, the UAV may simultaneously track the target object based on the first characteristic information of the target object through the first camera. In some embodiments, the UAV may control the first camera to shut down or sleep, thereby terminating the tracking of the target object through the first camera. The present disclosure does not limit methods of tracking the target object.

In some embodiments, while the UAV tracks the target object based on the first characteristic information of the target object through the first camera, the second camera may be in a non-operation state (e.g., sleep state or shut down state). When the UAV receives the tracking switch command (or in response to receiving the tracking switch command), the UAV may first start the second camera, and then obtain image information of a certain region of the environment in which the target object is located through the second camera. Finally, the UAV may determine a processing method based on whether an image of the certain region captured by the second camera includes the target object. The detailed descriptions of the process can refer to the above descriptions, which are not repeated.

In some embodiments, the first camera and the second camera of the UAV may maintain a linked mode. In other words, the first camera and the second camera of the UAV may maintain parallel perspectives. Attitude of the second gimbal of the UAV may change correspondingly as the attitude of the first gimbal changes. In some embodiments, tracking, by the UAV, the target object based on at least one of the first characteristic information or the second characteristic information may include: while the UAV tracks the target object based on the first characteristic information through the first camera, obtaining attitude information of the first gimbal and adjust attitude of the second gimbal based on the attitude information of the first gimbal, such that the attitude of the second camera is consistent with the attitude of the first camera. Next, the UAV may tune a camera parameter of the second camera, and obtain image information of a regional area of the target object through the second camera. The camera parameter may include the zoom magnification, the photosensitivity, etc. Through the above method, while tracking the target object through the first camera, the image information of the regional area of the target object may be obtained through the second camera. As a result, while tracking of the target object is maintained, useful information of the target object may be accurately obtained.

In some embodiments, after the UAV obtains the image information of the regional area of the target object through the second camera, while the target object is tracked based on the first characteristic information through the first camera, the regional area of the target object may be tracked based on the image information of the regional area of the target object through the second camera.

In some embodiments, the first camera of the UAV and the second camera of the UAV may be independently operated. In some embodiments, tracking, by the UAV, the target object based on at least one of the first characteristic information or the second characteristic information may include: while tracking, by the UAV, the target object based on the first characteristic information through the first camera, if the UAV receives a control command input by a user, adjusting attitude of the second gimbal based on the control command. In some embodiments, by adjusting the attitude of the second camera, an object of interest may be selected from an environment in which the target object is located. In some embodiments, during the process of adjusting, by the UAV, the attitude of the second gimbal based on the control command input by the user, if the UAV receives target confirmation command input by the user, the UAV may determine an object corresponding to the confirmation command in a current image captured by the second camera as the object of interest. Finally, the UAV may obtain image information of the object of interest through the second camera. Through the above method, while the target object is tracked through the first camera, the second gimbal may be freely controlled. In addition, the UAV may observe or track one or more objects of interest adjacent the target object through the second camera. The disclosed method may expand the applicable scope of the UAV tracking, and improve the UAV tracking performance.

In some embodiments, the UAV may include a first gimbal, a second gimbal, a first camera, and a second camera. The first gimbal may be configured to control attitude of the first camera. The second gimbal may be configured to control attitude of the second camera. In some embodiments, the UAV may obtain first characteristic information of the target object through the first camera, and obtain second characteristic information of the target object through the second camera. The UAV may track the target object based on at least one of the first characteristic information or the second characteristic information. The disclosed method may improve the tracking performance and expand the applicable scope of the tracking.

Figure 3:
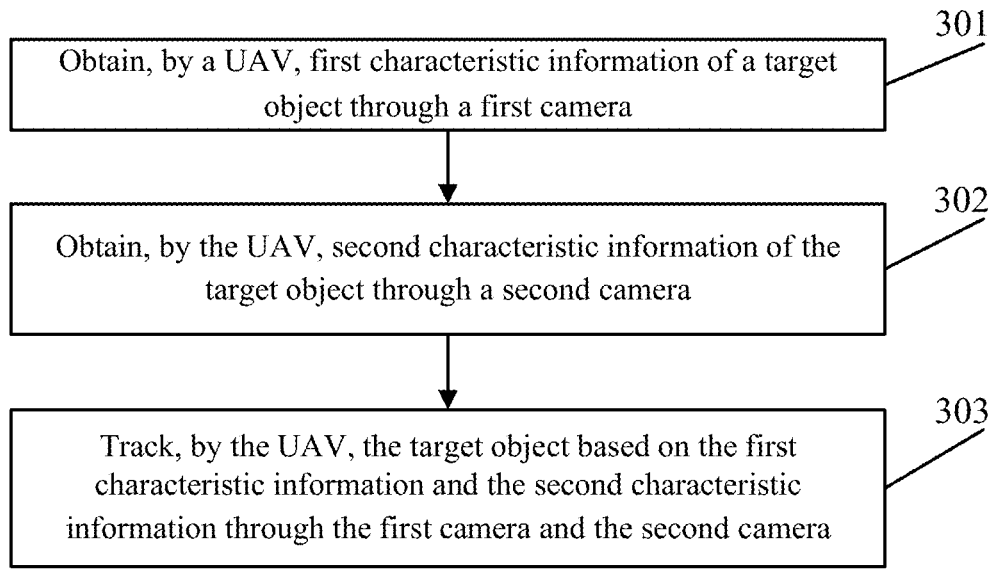
FIG. 3 is a flow chart illustrating another tracking method, according to another example embodiment.

FIG. 3 is a flow chart illustrating another tracking method. The tracking method shown in FIG. 3 may include:

Step S301: obtaining, by a UAV, first characteristic information of a target object through a first camera.

In some embodiments, the UAV may obtain the first characteristic information of the target object through the first camera mounted to the first gimbal of the UAV. In some embodiments, when the UAV receives a control command, the UAV may control the first camera based on an instruction included in the control command to acquire first image information that includes the target object. The UAV may obtain the first characteristic information of the target object based on the first image information that includes the target object. In some embodiments, the first characteristic information may include RGB color information. The first camera may be an ordinary camera configured to obtain the RGB color information of the target object. In some embodiments, the first camera may be other types of cameras configured to obtain other types of characteristic information of the target object, which is not limited by the present disclosure.

Step S302: obtaining, by the UAV, second characteristic information of the target object through a second camera.

In some embodiments, the UAV may obtain the second characteristic information of the target object through the second camera mounted to the second gimbal of the UAV. In some embodiments, when the UAV receives a control command, the UAV may control the second camera based on an instruction included in the control command to acquire second image information that includes the target object. The UAV may obtain the second characteristic information of the target object based on the second image information of the target object. In some embodiments, the second characteristic information may include heat distribution information. The second camera may be an infrared camera configured to obtain heat distribution information of the target object. In some embodiments, the second camera may be other types of cameras configured to obtain other types of characteristic information of the target object, which is not limited by the present disclosure.

Step S303: tracking, by the UAV, the target object based on the first characteristic information and the second characteristic information through the first camera and the second camera.

In some embodiments, the UAV may first obtain location information of the target object relative to the first camera based on the first image information that includes the target object that is acquired by the first camera and the obtained first characteristic information of the target object. The UAV may obtain location information of the target object relative to the second camera based on the second image information that includes the target object that is acquired by the second camera and the obtained second characteristic information of the target object. In some embodiments, the location information of the target object relative to the first camera or the second camera may include: an azimuth angle of the target object relative to the first camera or the second camera, location information of the target object in the first camera or the second camera. The UAV may fuse the location information of the target object relative to the first camera and the location information of the target object relative to the second camera to obtain fused location information of the target object relative to the first camera and the second camera. The fused location information of the target object relative to the first camera and the second camera indicates a best location of the target object relative to the first camera and the second camera. Then, based on the fused location information of the target object relative to the first camera and the second camera, the UAV may adjust the attitudes of the first gimbal and the second gimbal, thereby changing attitude information of the first camera and attitude information of the second camera, such that the location of the target object relative to the first camera and the second camera is the best. Finally, the UAV may simultaneously track the target object based on a preset tracking algorithm, the first characteristic information, and the second characteristic information through the first camera and the second camera, in both of which the attitude information has been changed. In some embodiments, the first characteristic information and the second characteristic information may include profile information of the target object. In some embodiments, the first camera and the second camera may be different types of cameras. Thus, the first characteristic information of the target object obtained through the first camera and the second characteristic information of the target object obtained through the second camera may be of different types. Through the above method, the target object may be tracked based on different characteristic information of the target object, thereby improving the tracking performance of the UAV.

In some embodiments, the UAV may track the target object by fusing different advantageous characteristics of different cameras. Next, an RGB camera and a thermal imaging camera are used as examples. The present disclosure does not limit the cameras to be these two types of cameras. For the RGB camera, the advantageous characteristics include color information and gradient information of an RGB image. For the thermal imaging camera, the advantageous characteristics include heat distribution information. Compared with the heat distribution information, the RGB color information may be richer and finer, and may be closer to human eyes. Therefore, the RGB color information may compensate for the non-intuitive disadvantages of the heat distribution information. On the other hand, heat distribution information is not sensitive to interference by light in the environment, which can compensate for the disadvantages of the RGB sensor, which is sensitive to the change in the environment. The UAV may fuse the RGB color information and the heat distribution information for tracking the target object. This method may combine the advantageous characteristics of the RGB camera and the thermal imaging camera, which compensate for the disadvantageous characteristics of each other. As a result, better tracking of the target object can be achieved.

In the conventional technologies, a UAV can only carry one type of camera, and can track the target object based on characteristic information of the target object obtained by one camera. As a result, the applicable scope of the tracking is limited. The UAV of the present disclosure may include dual gimbals, and may carry two different types of cameras at the same time. The UAV may combine the advantageous characteristics of the different cameras to track the same target, which may improve the tracking performance of the UAV and expand the applicable scope of tracking. For example, in power line inspections, the UAV may perform the inspects along the power line. When the UAV tracks the thin power line, if the UAV carries only an ordinary camera, the size of the pixel of the power line may be too small for the ordinary camera. Thus, the characteristics of the power line is not obvious, and it is difficult to track the power line in a complex wild environment. If, however, tracking the thin power line is simultaneously carried out in combination with a thermal imaging camera, it becomes easy to track an object whose temperature is higher than an environmental temperature through the thermal imaging camera. In the meantime, the thermal imaging camera may not be affected by environmental factors, such as exposure to light. Thus, the disclosed technology may better perform the inspection tasks. As another example, when the UAV is used to assist police in tracking a criminal suspect, if the UAV carries only the ordinary camera, then it becomes easy to lose track of the target due to the lighting. If, however, tracking the tracking target is simultaneously performed using a thermal imaging camera, heat distribution information of the tracking target may be obtained through the thermal imaging camera. It then becomes easy to track the target and not easy to lose the track of the target.

In some embodiments, the UAV may include a first gimbal, a second gimbal, a first camera, and a second camera. The first gimbal may be configured to control attitude of the first camera, and the second gimbal may be configured to control attitude of the second camera. The UAV may obtain first characteristic information of the target object through the first camera, and obtain the second characteristic information of the target object through the second camera. Then the UAV may track the target object based on the first characteristic information and the second characteristic information. The disclosed method can significantly improve the tracking performance and expand the applicable scope of the tracking.

Figure 4:
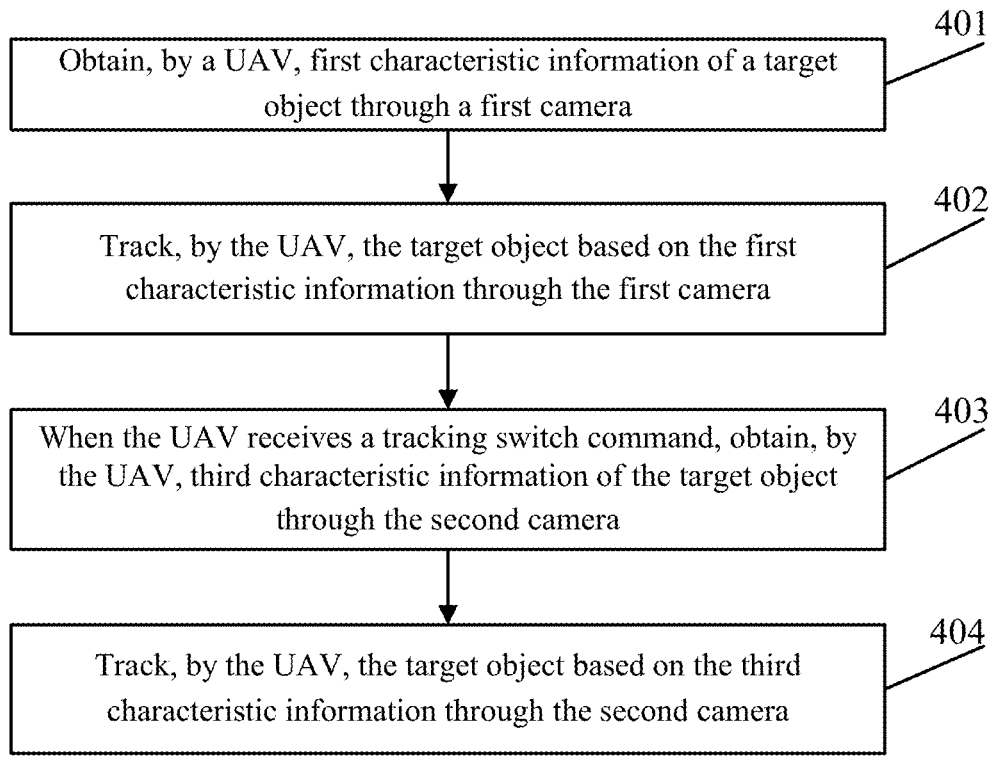
FIG. 4 is a flow chart illustrating another tracking method, according to another example embodiment.

FIG. 4 is a flow chart illustrating another tracking method. The tracking method may include:

Step S401: obtaining, by a UAV, first characteristic information of a target object through a first camera.

In some embodiments, the UAV may obtain the first characteristic information of the target object through the first camera mounted to a first gimbal of the UAV. For example, when the UAV receives a control command, the UAV may control the first camera based on an instruction included in the control command to acquire first image information that includes the target object, and to obtain a first characteristic information of the target object based on the first image information that includes the target object. The first characteristic information may include RGB color information. The first camera may be an ordinary camera configured to obtain the RGB color information of the target object. In some embodiments, the first camera may be other types of cameras configured to obtain other types of characteristic information of the target object, which is not limited by the present disclosure.

Step S402: tracking, by the UAV, the target object based on the first characteristic information through the first camera.

In some embodiments, the UAV may first obtain location information of the target object relative to the first camera based on the first image information that includes the target object acquired by the first camera and the obtained first characteristic information of the target object. The location information of the target object relative to the first camera may include: an azimuth angle of the target object relative to the first camera, the location information of the target object in the first camera. Then, the UAV may adjust the first gimbal based on the location information of the target object relative to the first camera, thereby changing attitude information of the first camera. Finally, the UAV may track the target object based on the first characteristic information and a preset tracking algorithm through the first camera whose attitude has been changed.

Step S403: when the UAV receives a tracking switch command (or in response to receiving a tracking switch command), obtaining, by the UAV, third characteristic information of the target object through the second camera.

In some embodiments, the UAV may obtain the third characteristic information of the target object through the second camera mounted to the second gimbal of the UAV. For example, when the UAV receives a control command, the UAV may control the second camera based on an instruction included in the control command to acquire third image information that includes the target object, and to obtain the third characteristic information of the target object based on the third image information that includes the target object. The third characteristic information may include heat distribution information. The second camera may be an infrared camera configured to obtain the heat distribution information of the target object. In some embodiments, the second camera may be other types of cameras configured to obtain other types of characteristic information of the target object, which is not limited by the present disclosure.

In some embodiments, prior to the UAV obtaining the third characteristic information of the target object through the second camera, the UAV may first obtain location information of the target object in the second camera. For example, the UAV may first calculate the azimuth angle of the target object relative to the UAV based on a characteristic parameter of the first camera, such as through the following example equations:

$$\text{yaw\_target} = \text{yaw\_gimbal1} + \text{FOV\_}X1 * \text{box1} \cdot x/\text{width1};$$

$$\text{pitch\_target} = \text{pitch\_gimbal1} + \text{FOV\_}Y1 * \text{box1} \cdot y/\text{height1};$$

$$\text{width\_target} = \text{FOV\_}X1 * \text{box1} \cdot w/\text{width1};$$

$$\text{height\_target} = \text{FOV\_}Y1 * \text{box1} \cdot h/\text{height1};$$

Then, the UAV may calculate the location information of the target object in the second camera based on the azimuth angle of the target object relative to the first camera and a characteristic parameter of the second camera, such as through the following example equations:

$$\text{box2} \cdot x = (\text{yaw\_target} - \text{yaw\_gimbal2}) * \text{width2}/\text{FOV\_}X2;$$

$$\text{box2} \cdot y = (\text{pitch\_target} - \text{pitch\_gimbal2}) * \text{height2}/\text{FOV\_}Y2;$$

$$\text{box2} \cdot w = \text{width\_target} * \text{width2}/\text{FOV\_}X2;$$

$$\text{box2} \cdot h = \text{height\_target} * \text{height2}/\text{FOV\_}Y2;$$

In the above equations, the location of the target object in the camera is represented by box (x:center_x y:center_y w:width w:height). yaw_gimbal1 and pitch_gimbal1 represent the lateral angle and the longitudinal angle of the first gimbal, respectively. yaw_gimbal2 and pitch_gimbal2 represent the lateral angle and the longitudinal angle of the second gimbal, respectively. width1 and height1 represent the width and height of images in the first camera, respectively. width2 and height2 represent the width and height of the images in the second camera. width_target and height_target represent the angle occupied by the target object in the lateral direction and the longitudinal direction, respectively. FOV_X and FOV_Y represent the field of view angle in the horizontal direction and vertical direction.

Next, a tracking initialization may be performed to the UAV based on the location information of the target object relative to the second camera. The tracking initialization may include: adjusting attitude information of the second camera, tuning a parameter of the second camera, etc. The characteristic parameter of the first camera and the characteristic parameter of the second camera may include at least one of a camera parameter or attitude information.

Step S404: tracking, by the UAV, the target object based on the third characteristic information through the second camera.

In some embodiments, the method in which the UAV tracks the target object based on the third characteristic information through the second camera may refer to the above descriptions of tracking, by the UAV, the target object based on the first characteristic information through the first camera, which are not repeated.

In some embodiments, after the UAV receives a tracking switch command (or in response to receiving a tracking switch command), during the process of tracking the target object based on the third characteristic information of the target object through the second camera, the UAV may simultaneously track the target object based on the first characteristic information of the target object through the first camera, or control the first camera to shut down or sleep, thereby terminating the tracking of the target object through the first camera, which are not limited by the present disclosure.

In some embodiments, the UAV may include a first gimbal, a second gimbal, a first camera, and a second camera. The first gimbal may be configured to control attitude of the first camera, and the second gimbal may be configured to control attitude of the second camera. When the UAV tracks the target object based on the obtained first characteristic information of the target object through the first camera, if the UAV receives a tracking switch command, the UAV may track the target object based on the obtained third characteristic information of the target object through the second camera. As a result, the disclosed method may significantly improve the tracking performance.

Figure 5:
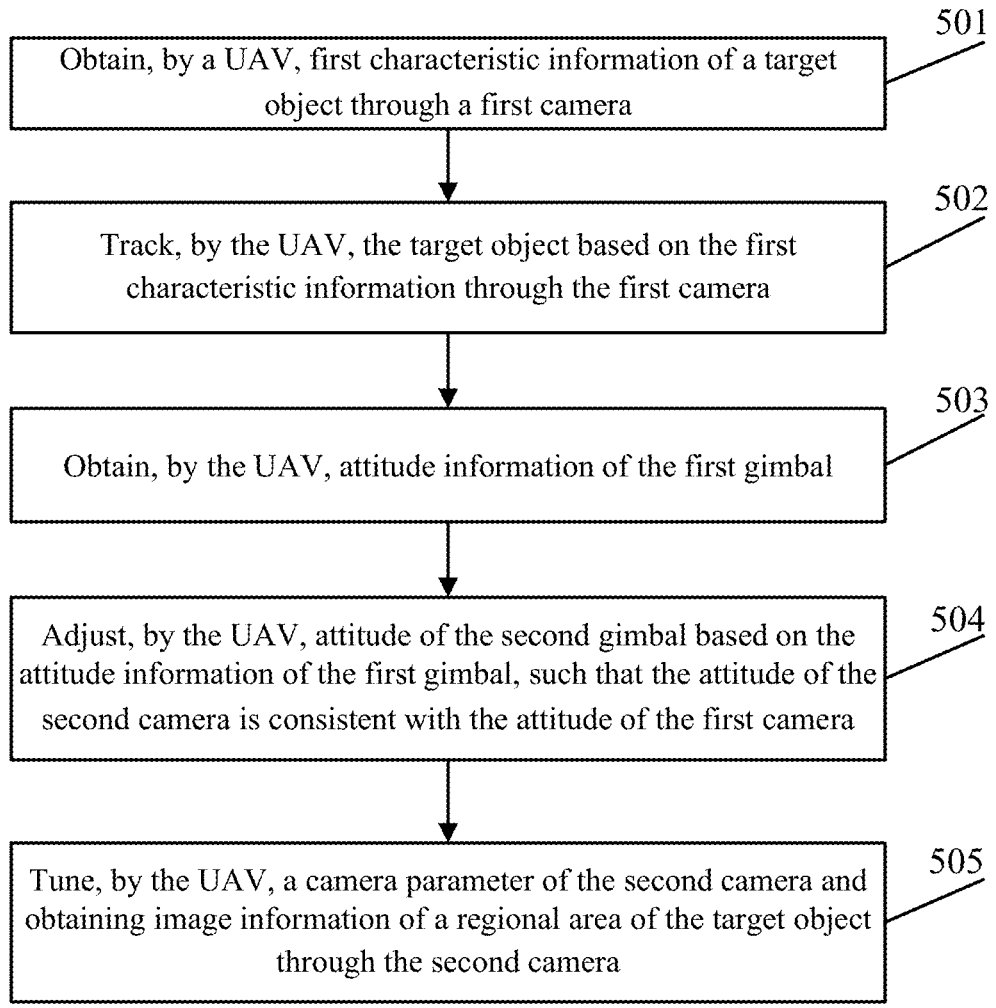
FIG. 5 is a flow chart illustrating another tracking method, according to another example embodiment.

FIG. 5 is a flow chart illustrating another tracking method. The tracking method may include:

Step S501: obtaining, by a UAV, first characteristic information of a target object through a first camera.

In some embodiments, the UAV may obtain the first characteristic information of the target object through the first camera mounted to the first gimbal of the UAV. For example, when the UAV receives a control command, the UAV may control the first camera based on an instruction included in the control command to acquire first image information that includes the target object, and to obtain the first characteristic information of the target object based on the first image information that includes the target object. The first characteristic information may include RGB color information. The first camera may be an ordinary camera configured to obtain the RGB color information of the target object. The first camera may be other types of cameras configured to obtain other types of characteristic information of the target object, which is not limited by the present disclosure.

Step S502: tracking, by the UAV, the target object based on the first characteristic information through the first camera.

In some embodiments, the UAV may first obtain location information of the target object relative to the first camera based on the first image information that includes the target object acquired by the first camera and the obtained first characteristic information of the target object. The location information of the target object relative to the first camera may include: an azimuth angle of the target object relative to the first camera, the location information of the target object in the first camera. Then, the UAV may adjust the first gimbal based on the location information of the target object relative to the first camera, thereby changing attitude information of the first camera. Finally, the UAV may track the target object based on the first characteristic information and a preset tracking algorithm through the first camera whose attitude has been changed.

Step S503: obtaining, by the UAV, attitude information of the first gimbal.

Step S504: adjusting, by the UAV, attitude of the second gimbal based on the attitude information of the first gimbal, such that the attitude of the second camera is consistent with the attitude of the first camera.

In some embodiments, the first camera of the UAV and the second camera of the UAV may be in a linked mode. In other words, the first camera and the second camera of the UAV may maintain parallel perspectives. Attitude of the second gimbal of the UAV may change correspondingly as the attitude of the first gimbal changes. While the UAV tracks the target object based on the first characteristic information through the first camera, the UAV may obtain the attitude information of the first gimbal, and may adjust the attitude of the second gimbal based on the attitude information of the first gimbal such that the attitude of the second camera is consistent with the attitude of the first camera.

Step S505: tuning, by the UAV, a camera parameter of the second camera and obtaining image information of a regional area of the target object through the second camera.

In some embodiments, the camera parameter may include the zoom magnification, the photosensitivity, etc. The regional area of the target object may be a part of the target object, a region corresponding to useful information that need to be obtained in the process of tracking the target object by the UAV.

In conventional technologies, when using a UAV carrying only one camera to track a target, there is a limit on the size and characteristic point of the target. Currently available tracking algorithms may have a relatively good tracking effect for objects having a suitable size and characteristic points, but may have difficulty in tacking objects having few characteristic points and a small volume. The tracking method of the present disclosure uses one camera to track characteristics-rich objects in a larger scope after expansion of the observation object, and uses another camera to zoom in to directly observe the target. The disclosed tracking method can effectively solve the issues associated with the conventional technologies. For example, when a UAV carrying one camera is deployed to assist a traffic police, the UAV may relatively stably track a car body, but may have difficulty in directly tracking a license plate. In the present disclosure, the UAV can track the car body through a first camera (e.g., an ordinary camera), and use a second camera (e.g., a high-magnification camera) to zoon in to view the license plate information of the car body tracked by the first camera. Through the above method, image information of the observation target can be effectively obtained, tracking performance can be improved, and the applicable scope of the tracking can be expanded.

In some embodiments, after the UAV obtains the image information of the regional area of the target object through the second camera, while tracking the target object based on the first characteristic information through the first camera, the UAV may track the regional area of the target object based on the obtained image information of the regional area of the target object.

In some embodiments, the UAV may include a first gimbal, a second gimbal, a first camera, and a second camera. The first gimbal may be configured to control attitude of the first camera. The second gimbal may be configured to control attitude of the second camera. While the UAV tracks the target object based on the obtained first characteristic information through the first camera, the UAV may obtain attitude information of the first gimbal, and adjust attitude of the second gimbal based on the attitude information of the first gimbal, such that attitude of the second camera is consistent with the attitude of the first camera. The UAV may tune a camera parameter of the second camera and obtain image information of a regional area of the target object through the second camera. The disclosed method can significantly improve the tracking performance and expand the applicable scope of the tracking.

Figure 6:
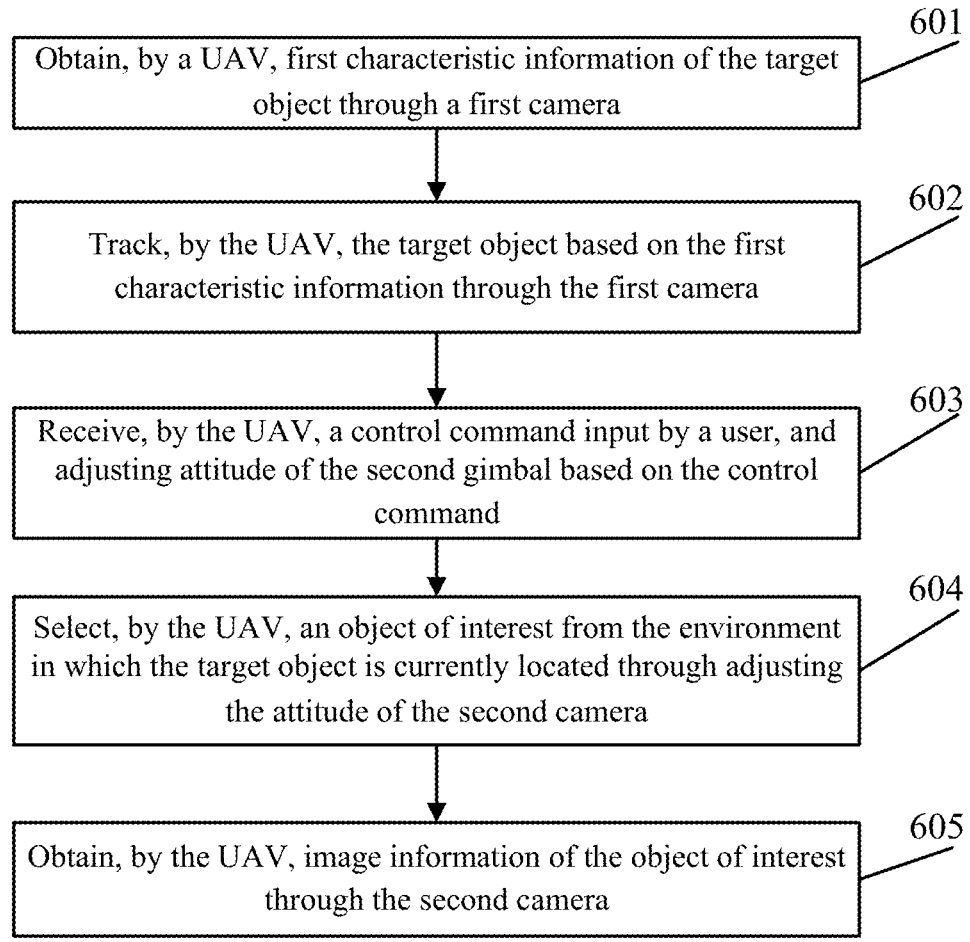
FIG. 6 is a flow chart illustrating another tracking method, according to another example embodiment.

FIG. 6 is a flow chart illustrating another tracking method. The tracking method may include:

Step S601: obtaining, by a UAV, first characteristic information of the target object through a first camera.

In some embodiments, the UAV may obtain the first characteristic information of the target object through the first camera mounted to the first gimbal of the UAV. For example, when the UAV receives a control command, the UAV may control the first camera based on an instruction included in the control command to acquire first image information that includes the target object, and to obtain the first characteristic information of the target object based on the first image information that includes the target object. The first characteristic information may include RGB color information. The first camera may be an ordinary camera configured to obtain the RGB color information. The first camera may be other types of cameras configured to obtain other types of characteristic information of the target object, which is not limited by the present disclosure.

Step S602: tracking, by the UAV, the target object based on the first characteristic information through the first camera.

In some embodiments, the UAV may first obtain location information of the target object relative to the first camera based on the obtained first image information that includes the target object and the obtained first characteristic information of the target object. The location information of the target object relative to the first camera may include: an azimuth angle of the target object relative to the first camera, location information of the target object in the first camera. The UAV may adjust the first gimbal based on the location information of the target object relative to the first camera, thereby changing attitude information of the first camera. Finally, the UAV may track the target object based on the first characteristic information and a preset tracking algorithm through the first camera whose attitude has been changed.

Step S603: receiving, by the UAV, a control command input by a user, and adjusting attitude of the second gimbal based on the control command.

In some embodiments, the first camera of the UAV and the second camera of the UAV may be operated independently. While the UAV tracks the target object based on the first characteristic information through the first camera, if the UAV receives a control command input by the user, the UAV may adjust attitude of the second gimbal based on the control command. For example, after the UAV receives the control command, the UAV may adjust the attitude of the second gimbal based on an instruction included in the control command, thereby changing attitude information of the second camera based on the instruction from the user. Further, during the process of adjusting the attitude of the second gimbal, the UAV may obtain image information of different regions of an environment in which the target object is currently located through different perspectives of the second camera.

Step S604: selecting, by the UAV, an object of interest from the environment in which the target object is currently located through adjusting the attitude of the second camera.

In some embodiments, during the process of adjusting the attitude of the second gimbal based on the control command input by the user, if the UAV receives a target confirmation command input by the user, the UAV may determine an object corresponding to the target confirmation command in a current image captured by the second camera as the object of interest. The object of interest is an object that is different from the target object.

Step S605: obtaining, by the UAV, image information of the object of interest through the second camera.

In some embodiments, after the UAV obtains the image information of the object of interest in the environment in which the target object is located through the second camera, while the UAV tracks the target object based on the first characteristic information through the first camera, the UAV may track the object of interest based on the obtained image information of the object of interest through the second camera.

In conventional technologies, when tracking a target using a UAV carrying only one camera, the gimbal may be automatically locked, which makes it difficult to adjust an observation angle based on the need of the user. The UAV of the present disclosure includes two cameras and two gimbals corresponding to the two cameras. In the method of the present disclosure, while the target is tracked using the first camera, when the first gimbal corresponding to the first camera is locked, another free camera, i.e., the second camera, may be used to observe a region of interest around the target object. Through the above method, the scope of the UAV tracking can be significantly expanded, and the UAV tracking efficiency can be improved.

In some embodiments, the UAV may include a first gimbal, a second gimbal, a first camera, and a second camera. The first gimbal may be configured to control attitude of the first camera. The second gimbal may be configured to control attitude of the second camera. While the UAV tracks the target object based on the obtained first characteristic information through the first camera, if the UAV receives a control command, the UAV may select an object of interest through adjusting the attitude of the second camera based on the control command. The UAV may obtain image information of the object of interest through the second camera. The disclosed method can significantly improve the tracking performance and expand the applicable scope of the tracking.

Figure 7:
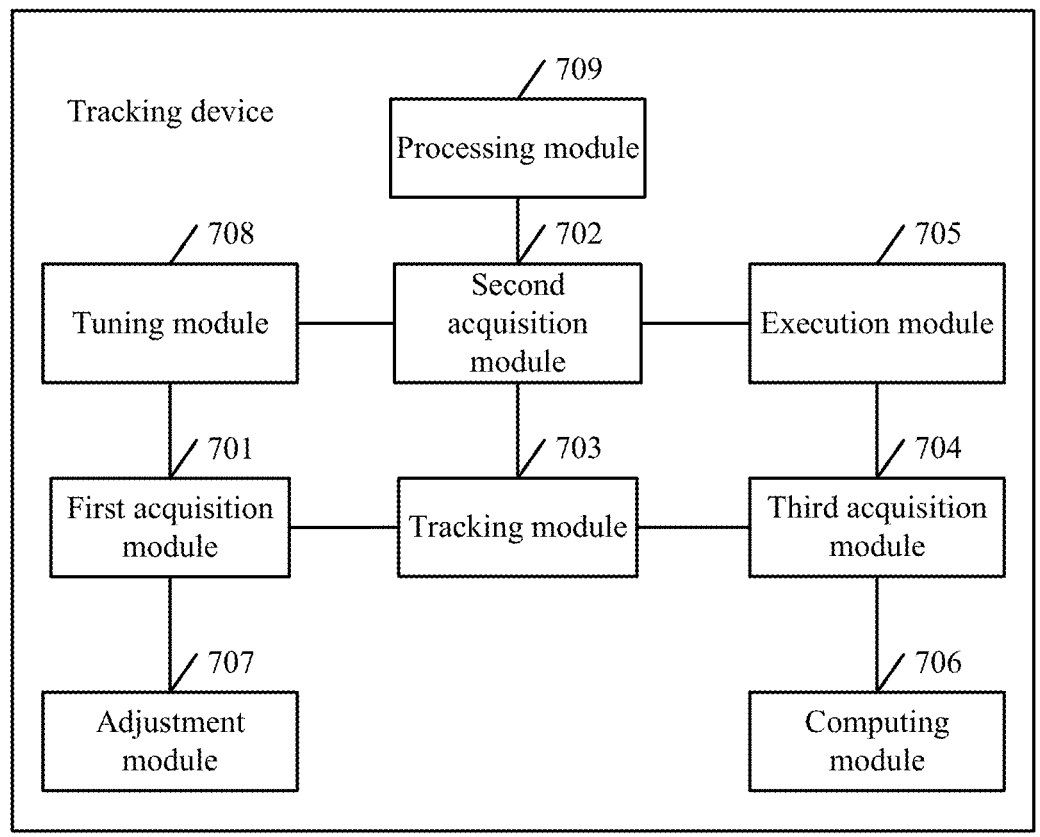
FIG. 7 is a schematic diagram of a tracking device, according to an example embodiment.

FIG. 7 is a schematic diagram of a tracking device. The tracking device may be implemented in a UAV. The UAV may include a first gimbal, a second gimbal, a first camera, and a second camera. The first gimbal may be configured to control the attitude of the first camera, and the second gimbal may be configured to control the attitude of the second camera. The tracking device may include:

a first acquisition module (or apparatus) 701 configured to obtain the first characteristic information of the target object through the first camera;

a second acquisition module (or apparatus) 702 configured to obtain the second characteristic information of the target object through the second camera;

a tracking module (or apparatus) 703 configured to track the target object based on at least one of the first characteristic information or the second characteristic information.

In some embodiments, the tracking module 703 may be configured to simultaneously track the target object based on the first characteristic information and the second characteristic information through the first camera and the second camera.

In some embodiments, the first characteristic information may include red, green, blue ("RGB") color information. The second characteristic information may include heat distribution information.

In some embodiments, the tracking module 703 may be configured to track the target object based on the first characteristic information through the first camera.

In some embodiments, the second acquisition module 702 may be configured to obtain third characteristic information of the target object through the second camera after a tracking switch command is received (or in response to receiving a tracking switch command).

In some embodiments, the tracking module 703 may be configured to track the target object based on the third characteristic information through the second camera.

The tracking device may also include:

a third acquisition module (or apparatus) 704 configured to obtain location information of the target object in the second camera;

an execution module (or apparatus) 705 configured to perform a tracking initialization based on the location information; and a computing module (or apparatus) 706 configured to calculate the azimuth angle of the target object relative to the UAV based on a characteristic parameter of the first camera.

In some embodiments, the computing module 706 may be configured to calculate the location information of the target object in the second camera based on a characteristic parameter of the second camera and the azimuth angle.

In some embodiments, the characteristic parameter may include at least one of: a camera parameter or attitude information.

In some embodiments, the first acquisition module 701 may be configured to obtain the attitude information of the first gimbal.

The tracking device may also include:

an adjustment module (or apparatus) 707 configured to adjust the attitude of the second gimbal based on the attitude information of the first gimbal, such that the attitude of the second camera is consistent with the attitude of the first camera; and a tuning module (or apparatus) 708 configured to tune a camera parameter of the second camera.

In some embodiments, the second acquisition module 702 may be configured to obtain image information of a regional area of the target object through the second camera.

The tracking device may also include:

a processing module (or apparatus) 709 configured to receive a control command input by a user and adjust the attitude of the second gimbal based on the control command.

The processing module 709 may also be configured to select an object of interest in an environment in which the target object is currently located through adjusting the attitude of the second camera.

In some embodiments, the second acquisition module 702 may be configured to obtain image information of the object of interest through the second camera.

In some embodiments, functions of the various functional modules of the tracking device may be implemented based on the various embodiments of the tracking method. The detailed implementation may refer to the descriptions of the various embodiments of the tracking method, which is not repeated.

In some embodiments, the UAV may include a first gimbal, a second gimbal, a first camera, and a second camera. The first gimbal may be configured to control the attitude of the first camera, and the second gimbal may be configured to control the attitude of the second camera. The UAV may obtain the first characteristic information of the target object through the first camera, and obtain the second characteristic information of the target object through the second camera. The UAV may track the target object through at least one of the first characteristic information or the second characteristic information. The disclosed tracking device may significantly improve the tracking performance and expand the applicable scope of the tracking.

Figure 8:
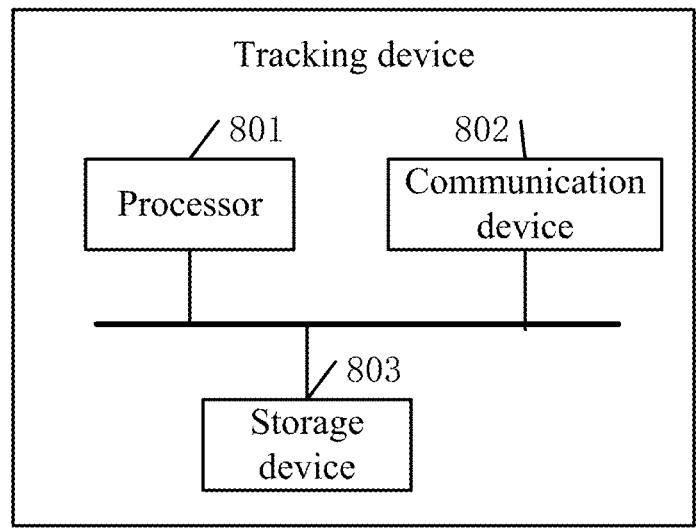
FIG. 8 is a schematic diagram of another tracking device, according to another example embodiment.

FIG. 8 is a schematic diagram of another tracking device. The tracking device may include a processor 801, a communication device 802, and a storage device 803. The processor 801 may be connected with the communication device 802 and the storage device 803 through a bus.

In some embodiments, the processor 801 may include a microcontroller, a baseband processor, a baseband chip, a digital signal processor ("DSP"), or a system on chip ("SOC") that includes a baseband processor and an application processor. The communication device 802 may be a radio frequency receiver or a radio frequency chip. For example, the communication device 802 may include an integrated transmitter ("TX") and receiver ("RX"). The storage device 803 may be a memory device of the tracking device configured to store program and data. In some embodiments, the storage device 803 may be a high speed random access memory ("RAM") storage device, or a non-volatile memory, such as at least one magnetic storage device. The storage device 803 may include at least one storage device remotely disposed from the processor 801.

In some embodiments, the storage device 803 may be configured to store a program code. The processor 801 may be configured to retrieve the program code stored in the storage device 803, and may execute the program code to perform the following operations:

In some embodiments, the processor 801 may obtain the first characteristic information of the target object through the first camera.

In some embodiments, the processor 801 may obtain the second characteristic information of the target object through the second camera.

In some embodiments, the processor 801 may track the target object based on at least one of the first characteristic information or the second characteristic information.

In some embodiments, the processor 801 may simultaneously track the target object based on the first characteristic information and the second characteristic information through the first camera and the second camera.

The first characteristic information may include red, green, and blue ("RGB") color information. The second characteristic information may include heat distribution information.

In some embodiments, the processor 801 may track the target object based on the first characteristic information through the first camera.

In some embodiments, the communication device 802 may be configured to receive a tracking switch command.

In some embodiments, the processor 801 may be configured to obtain third characteristic information of the target object through the second camera after the communication device 802 receives the tracking switch command.

In some embodiments, the processor 801 may be configured to track the target object based on the third characteristic information through the second camera.

In some embodiments, the processor 801 may be configured to obtain location information of the target object in the second camera.

In some embodiments, the processor 801 may be configured to perform a tracking initialization based on the location information.

In some embodiments, the processor 801 may be configured to calculate an azimuth angle of the target object relative to the UAV based on a characteristic parameter of the first camera.

In some embodiments, the processor 801 may be configured to calculate location information of the target object in the second camera based on the characteristic parameter of the second camera and the azimuth angle.

In some embodiments, the characteristic parameter may include at least one of a camera parameter or attitude information.

In some embodiments, the processor 801 may be configured to obtain the attitude information of the first gimbal.

In some embodiments, the processor 801 may be configured to adjust attitude of the second gimbal based on the attitude information of the first gimbal, such that the attitude of the second camera is consistent with the attitude of the first camera.

In some embodiments, the processor 801 may be configured to tune a camera parameter of the second camera.

In some embodiments, the processor 801 may be configured to obtain image information of a regional area of the target object through the second camera.

In some embodiments, the communication device 802 may be configured to receive a control command input by a user.

In some embodiments, the processor 801 may be configured to adjust the attitude of the second gimbal based on the control command.

In some embodiments, the processor 801 may be configured to select an object of interest in an environment in which the target object is currently located through adjusting the attitude of the second camera.

In some embodiments, the processor 801 may be configured to obtain image information of the object of interest through the second camera.

In some embodiments, the processor 801 and the communication device 802, and the implementation of the various embodiments of the tracking method, may be applied to the implementation of the tracking device shown in FIG. 7, which are not repeated.

In some embodiments, the UAV may include a first gimbal, a second gimbal, a first camera, and a second camera. The first gimbal may be configured to control the attitude of the first camera. The second gimbal may be configured to control the attitude of the second camera. The UAV may obtain first characteristic information of the target object through the first camera, and obtain second characteristic information of the target object through the second camera. The UAV may track the target object based on at least one of the first characteristic information or the second characteristic information. The disclosed tracking device may significantly improve the tracking performance and expand the applicable scope of the tracking.

It is understood that in the above embodiments of the disclosed method, for simplicity of description, the method is described as a combination of a series of steps. A person having ordinary skills in the art can appreciate that the present disclosure is not limited by the sequence of the described steps because some steps may be executed in other orders or sequences, or may be executed simultaneously. In addition, a person having ordinary skills in the art can appreciate, the embodiments described in this specification are example embodiments, and one or more of the steps and modules included in these embodiments may be omitted.

A person having ordinary skills in the art can appreciate that all or some of the steps included in each embodiment of the disclosed method may be realized through a computer software program instructing related hardware. The program may be stored in a non-transitory computer-readable medium. The computer-readable medium may include a flash memory disk, a read-only memory ("ROM"), a random access memory ("RAM"), a magnetic disk, or an optical disk.

The above embodiments are only examples of the present disclosure, and do not limit the scope of the present disclosure. A person having ordinary skills in the art can understand all or some of the steps of the disclosed embodiments, and make equivalent modifications based on the claims of the present disclosure. Such modifications still fall within the scope of the present disclosure.

What is claimed is:

1. A tracking method, comprising:
    obtaining first characteristic information of a target object through a first camera;
    obtaining second characteristic information of the target object through a second camera;
    tracking the target object based on the first characteristic information through the first camera;
    obtaining attitude information of a first gimbal to which the first camera is mounted;
    receiving a control command input by a user, and adjusting an attitude of a second gimbal to which the second camera is mounted based on the attitude information of the first gimbal to maintain consistency between an attitude of the second camera and an attitude of the first camera;
    selecting an object of interest in an environment in which the target object is currently located through adjusting the attitude of the second camera; and
    obtaining image information of the object of interest through the second camera.

2. The tracking method of claim 1, wherein tracking the target object includes:
    tracking the target object based on the first characteristic information and the second characteristic information through the first camera and the second camera.

3. The tracking method of claim 1, wherein the first characteristic information comprises red, green, and blue ("RGB") color information, and the second characteristic information comprises heat distribution information.

4. The tracking method of claim 1, further comprising:
    in response to receiving a tracking switch command, obtaining third characteristic information of the target object through the second camera;
    wherein tracking the target object includes tracking the target object further based on the third characteristic information through the second camera.

5. The tracking method of claim 4, further comprising:
    prior to obtaining the third characteristic information of the target object through the second camera:
        obtaining location information of the target object in the second camera; and
        performing a tracking initialization based on the location information.

6. The tracking method of claim 5, wherein obtaining the location information of the target object in the second camera includes:
    calculating an azimuth angle of the target object relative to an unmanned aerial vehicle that carries the first camera and the second camera based on a characteristic parameter of the first camera; and
    calculating the location information of the target object in the second camera based on a characteristic parameter of the second camera and the azimuth angle.

7. The tracking method of claim 6, wherein the characteristic parameter of the first camera or the characparameter of the second camera includes at least one of a camera parameter or attitude information.

8. The tracking method of claim 1, further comprising:
tuning a camera parameter of the second camera and obtaining image information of a regional area of the target object through the second camera.

9. The tracking method of claim 1, wherein the first camera and the second camera are cameras of different types.

10. A tracking device comprising:
a first acquisition apparatus configured to obtain first characteristic information of a target object through a first camera and attitude information of a first gimbal to which the first camera is mounted;
a second acquisition apparatus configured to obtain second characteristic information of the target object through a second camera;
a tracking apparatus configured to track the target object based on the first characteristic information through the first camera; and
a processing apparatus configured to receive a control command input by a user for adjusting an attitude of a second gimbal to which the second camera is mounted;
an adjusting apparatus configured to adjust the attitude of the second gimbal to which the second camera is mounted based on the attitude information of the first gimbal to maintain consistency between an attitude of the second camera and an attitude of the first camera; wherein:
the processing apparatus is further configured to select an object of interest in an environment in which the target object is currently located through adjusting the attitude of the second camera; and
the second acquisition apparatus is further configured to obtain image information of the object of interest through the second camera.

11. The tracking device of claim 10, wherein the tracking apparatus is configured to track the target object based on the first characteristic information and the second characteristic information through the first camera and the second camera.

12. The tracking device of claim 10, wherein the first characteristic information comprises red, green, and blue ("RGB") color information, and the second characteristic information comprises heat distribution information.

13. The tracking device of claim 10, wherein:
the second acquisition apparatus is further configured to obtain third characteristic of the target object through the second camera in response to receiving a tracking switch command, and
the tracking apparatus is further configured to track the target object based on the third characteristic information through the second camera.

14. The tracking device of claim 10, further comprising:
a third acquisition apparatus configured to obtain location information of the target object in the second camera; and
an execution apparatus configured to perform a tracking initialization based on the location information.

15. The tracking device of claim 14, further comprising:
a computing apparatus configured to:
calculate an azimuth angle of the target object relative to an unmanned aerial vehicle that includes the tracking device based on a characteristic parameter of the first camera; and
calculate the location information of the target object in the second camera based on a characteristic parameter of the second camera and the azimuth angle.

16. The tracking device of claim 15, wherein the characteristic parameter of the first camera or the characteristic parameter of the second camera comprises at least one of a camera parameter or attitude information.

17. The tracking device of claim 10, further comprising:
a tuning apparatus configured to tune a camera parameter of the second camera;
wherein the second acquisition apparatus is further configured to obtain image information of a regional area of the target object through the second camera.

18. The tracking device of claim 10, wherein the first camera and the second camera are cameras of different types.

* * * * *